M. W. TORBET.
MACHINE FOR DETERMINING THE STATIC AND DYNAMIC UNBALANCE OF ROTATING BODIES.
APPLICATION FILED MAY 29, 1919.
1,392,028.
Patented Sept. 27, 1921.
3 SHEETS—SHEET 1.
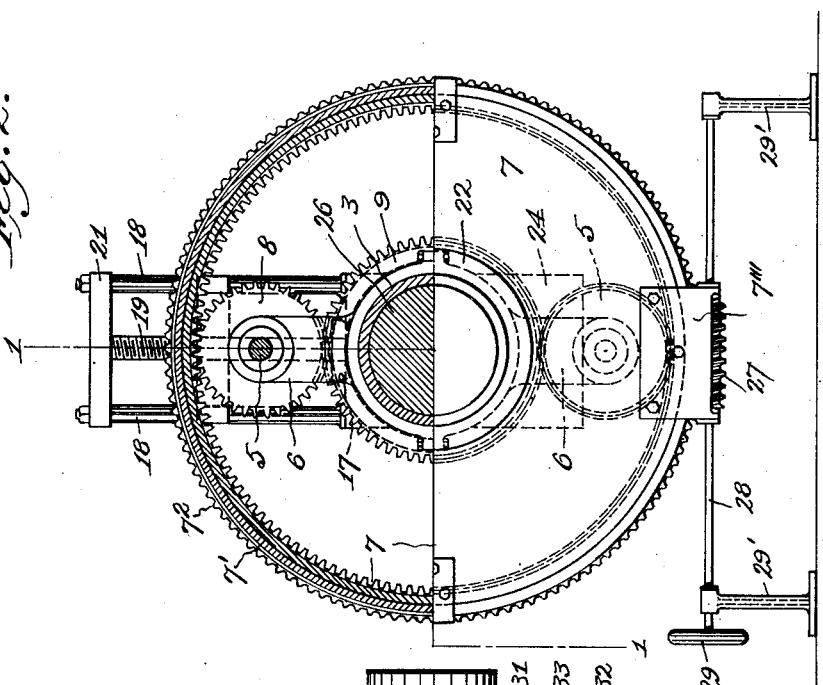
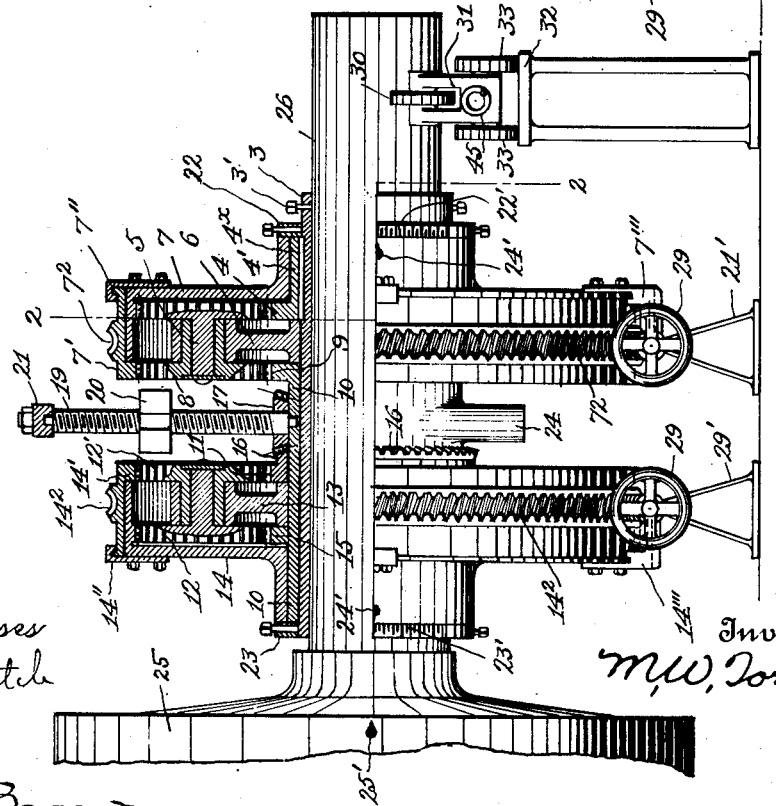

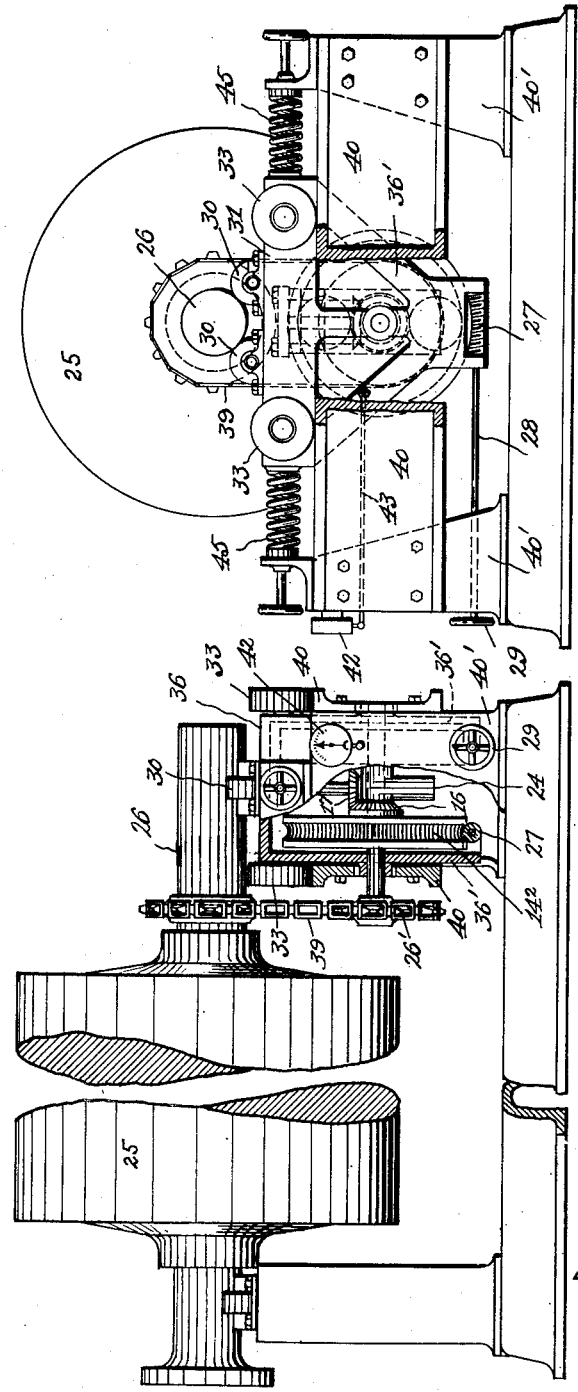

M. W. TORBET.
MACHINE FOR DETERMINING THE STATIC AND DYNAMIC UNBALANCE OF ROTATING BODIES.
APPLICATION FILED MAY 29, 1919.
1,392,028.
Patented Sept. 27, 1921.
3 SHEETS—SHEET 3.
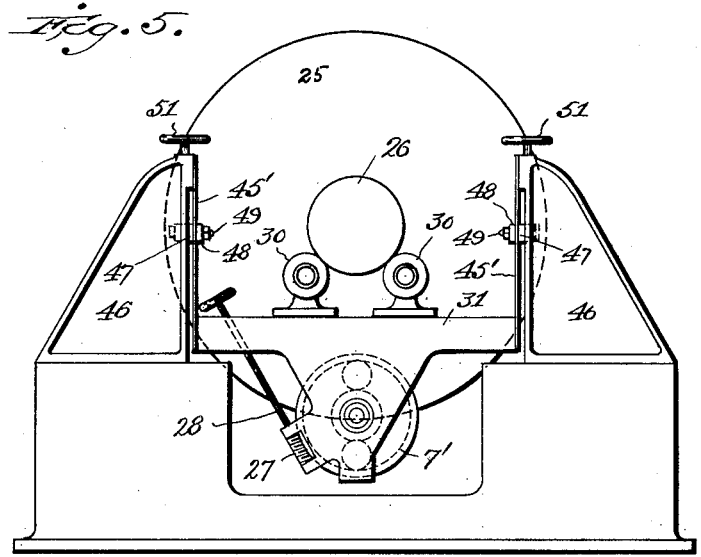
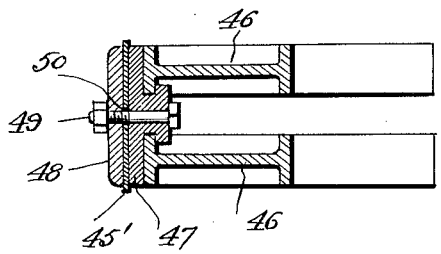
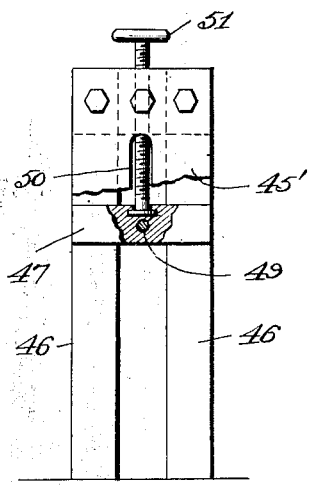

UNITED STATES PATENT OFFICE.

MAYSON WHITE TORBET, OF JACKSON, MICHIGAN, ASSIGNOR TO VIBRATION SPECIALTY COMPANY, OF PHILADELPHIA, PENNSYLVANIA, A CORPORATION OF DELAWARE.

MACHINE FOR DETERMINING THE STATIC AND DYNAMIC UNBALANCE OF ROTATING BODIES.

1,392,028.   Specification of Letters Patent.   Patented Sept. 27, 1921.

Application filed May 29, 1919. Serial No. 300,707.

*To all whom it may concern:*

Be it known that I, MAYSON WHITE TORBET, a citizen of the United States, residing at Jackson, in the county of Jackson and State of Michigan, have invented a new and useful Machine for Determining the Static and Dynamic Unbalance of Rotating Bodies, of which the following is a specification.

My invention relates to improvements in that class of balancing machines in which the static and dynamic unbalance, either or both, of the rotating body under investigation are made known, percepticle or apparent by the vibratory motion of one end or part of the rotating body or its support which is subjected to an elastic constraint, the other end of the rotating body or its support being flexibly fixed or constrained so that one point of the rotating body or one line of its support will be stationary; and the objects of my invention are, first, to provide a balancing weight adjustable independently and simultaneously in either direction in the plane in which it acts and in either direction in its distance from the axis of rotation of the rotating body without stopping or slowing the rotation of the rotating body to which it is attached; second, to provide means for such adjustment in plane of action and radial distance while the rotating body is in motion in such a manner as will interfere but slightly with or exercise but little damping effect upon the vibratory motion of the elastically constrained end or part of the rotating body under investigation or its support.

I attain these objects by the mechanism illustrated in the accompanying drawing, in which—

Figure 1 shows a vertical section of the mechanism on the line 1—1 of Fig. 2;

Fig. 2 is a vertical section on the line 2—2 of Fig. 1;

Fig. 3 shows a view partly in side elevation and partly in vertical section of another embodiment of my invention;

Fig. 4 is an end elevation of the same, partly in section;

Figs. 5, 6 and 7 are views of another modification.

The unbalanced couple exerted by a rotating body which is not in dynamic balance tends to bend the shaft, wear the bearings and produce vibrations in the bearing supports or foundations in manner similar to the effect of the centrifugal force exerted by a rotating body not statically balanced, and, since it is not exerted when the body is at rest, is difficult to locate and correct. I am enabled with my invention to locate and measure both static and dynamic unbalance in rotating bodies to which it may be attached.

This type of so-called pendular-motion balancing machine is now used for determining the unbalance of rotors of electrical machinery, steam turbines, automobile and aeroplane-motor crank-shafts, and similar machine elements. In this machine, the vibrating end of the rotor under investigation rests upon a spring or other elastic support so that it may move under the influence of the forces developed by the unbalanced rotor, vibration taking place in a vertical plane, while in my preferred construction I support the part under investigation upon a carriage which is constrained by springs, so that it may move against the action of the springs under the influence of the forces developed by the unbalanced rotor, vibration taking place in a horizontal plane.

In the usual practice with this type of balancing machine, the unbalanced rotor is placed so that one of its bearings is flexible but fixed in position, the other bearing being suspended or constrained by springs or other elastic support so that it may move under the influence of the forces developed by the unbalanced rotor. To determine and correct the existing conditions of unbalance, balancing weights are attached to the rotor near the vibrating end until vibration ceases. The weight, radial distance and angular position of the balancing weight or weights is then noted and the weights removed. The rotor is then turned end for end, the process repeated, and weight, radial distance and angular position of this second balancing weight noted. Knowing the angle between the two balancing weights, their amounts and radial distances, the equivalent component weights required to balance the static force and dynamic couple, and their respective positions may be computed.

The greatest difficulty with and unsatisfactory performance of balancing machines of this type lies in the fact that the rotor must be stopped each time the weights are moved or adjusted, and in order that the amplitude of the vibrations may provide consistent indications of the progress of the search for the proper weight, position and amount, the rotor must be brought to almost exactly the same rotative speed for each trial. This condition is not easy to attain, and my effort has been to provide a balancing weight which may, while the rotor is in motion, be adjusted either in its angular position with regard to the rotor or in its radial distance from the axis of rotation, these two adjustments being independent of each other, the construction being such that the weight may be adjusted in either direction circumferentially as well as in either direction radially to thereby facilitate the manual operation of adjusting the weight to an exact balancing position.

In my preferred construction, I accomplish these results by means of an adjustable weight controlled by two epicylic trains of gears, one train controlling the angular position of the weight with reference to the rotor and the other train controlling its radial distance from the axis of rotation, the adjustments of the position of the weight being made by movement of the outer gear of each train, such outer gear being normally stationary.

Referring to Figs. 1 and 2 of the drawings, 3 is a bushing or sleeve, firmly attached to the rotor-shaft, the purpose of this bushing being to allow one size of machine to be fitted to several sizes of shafts. 4 is a spur-gear which is firmly attached to the bushing 3. 5 is a pair of gears which mesh with 4 and are carried upon bearings in the idler-arm or spider 6. 7 is an internal or annular gear meshing with the gears 5 and itself carried by bearing 4' upon a cylindrical projection on the gear 4. 7' is an internal or annular gear meshing with the gears 8 and itself carried upon the internal gear 7 so that it may be moved circumferentially relative thereto but be held in the same axial position by guides or clips 7''. The internal gears 7 and 7' are identical in pitch diameter and number of teeth, but on the exterior of the internal gear 7' are cut worm wheel teeth $7^2$. The pair of gears 8 are identical in pitch diameter and number of teeth with the gears 5, but are free to rotate independently of the gears 5. 9 is a spur-gear identical in pitch diameter and number of teeth with the gear 4 and is firmly attached to the sleeve 10 which is loose on the bushing 3. 11 is a spur-gear loose on the sleeve 10. 12 and 12' are two pairs of idler-gears carried by the arm or spider 13, the gears 12 and 12' and the spider 13 being similar to the gears 5 and 8 and the spider 6. The gears 12 and 12' are free to rotate independently of each other. 14 is an internal or annular gear meshing with the gears 12 and being carried by a bearing on the sleeve 10. 14' is an internal or annular gear meshing with the gears 12' and itself carried upon the internal gear 14 so that it may be moved circumferentially relative thereto, but is held in the same axial position by guides or clips 14''. The internal gears 14 and 14' are identical in pitch diameter and number of teeth, but on the exterior of the internal gear 14' are cut worm wheel teeth $14^2$. 15 is a spur-gear firmly attached to the sleeve 10 and identical in diameter and number of teeth with the gear 11. The gear 15 meshes with the idlers 12. 16 is a bevel-gear firmly attached to the gear 11. 17 is a bevel-gear meshing with 16. The guide rods 18 are attached to the sleeve 10 and to the yoke 21.

19 is a screw firmly attached to the bevel-gear 17 and carried in bearings in the sleeve 10 and the yoke 21. The weight 20 has in its center a threaded hole whereby it is carried on the screw 19. The bevel-gear 17, the guide rods 18, the screw 19 and the yoke 21 provide a mechanism whereby the weight 20 may be moved in or out on the screw 19 and guided by the guide rods 18. The thrust-rings 22 and 23 form thrust bearings which keep the mechanism in longitudinal position on the shaft. The thrustrings 22 and 23 may have on their outer annular surfaces markings or graduations 22' and 23', respectively, which serve to read directly the angular position of the weight 20 with respect to a definite point or mark 25' on the rotor 25, as well as the radial distance of the weight from its zero or neutral position. 24 is a projection or eccentric weight which places the mechanism in static and dynamic balance when the weight is at its zero, neutral or extreme inner position. 25 is the rotor under investigation and 26 is the rotor spindle or shaft on which the balancing mechanism is fixed. 27 are worms or endless screws which engage with the worm wheel teeth on the annular gears 7' and 14'. 28 are light flexible shafts on which the worms 27 are secured. 29 are hand-wheels by which the shafts 28 and worms 27 may be rotated. In proximity to the worms 27, the annular gears 7 and 14 carry lug-clips 7''' and 14''' which bear against the ends of the worms 27 and prevent the annular gears 7 and 14 from rotating when the worms 27 are rotated. It will be observed that in the structure illustrated in Figs. 1 and 2, the vibrating-end of the shaft under investigation rests between rollers 30. In Fig. 1, these rollers are supported on a carriage or pedestal 31 which is adapted to move horizontally on the upper flat face of a table 32, anti-friction rollers 33 being mounted on the pedestal.

When the entire mechanism is assembled on the rotor spindle or shaft, and the bushing 3 firmly attached to this shaft, the rotation of the shaft is communicated to the spur-gear 4, which in turn drives the idlers 5 and 8 which mesh with it and the internal gears 7 and 7'. The internal gears 7 and 7' being held stationary, the gear 9 and the sleeve 10 to which it is attached are driven by the idlers 8 at the same speed as the shaft 26; hence, the weight 20 being attached to the sleeve 10 will not change its angular position with respect to the rotor 25 but will rotate with it. If, however, while the rotor is at rest or in motion and the internal gear 7 held stationary, the internal gear 7' be moved through any angle by the worm 27 or other suitable means, the gear 9, the sleeve 10 and the weight 20 will be moved through a proportionate angle; in this manner, therefore, the balancing weight 20 may be placed in any and every angular position with respect to the shaft 26 and the rotor 25.

Similarly for the other train of gears, the gear 15 is firmly attached to the sleeve 10 and rotates with it, driving the gear 11 through the idlers 12 and 12', which mesh with the gear 15, the gear 11 and the annular gears 14 and 14'. As long as the annular gears 14 and 14' remain stationary, the gear 11 will rotate at the same speed as the gear 15 and the sleeve 10; hence the bevel-gear 16 which is firmly attached to the gear 11, will not rotate the bevel-gear 17 which meshes with it. If, however, while the rotor is at rest or in motion and the internal gear 14 held stationary, the internal gear 14' be moved through any angle by the worm 27 or other suitable means, the gear 11 and the bevel-gear 16 will be moved through a proportionate angle and the bevel-gear 17 will be rotated a certain amount corresponding to the angle through which the internal gear 14' is moved. The rotation of the bevel-gear 17 being communicated to the screw 19, the weight 20 will be moved in or out a distance corresponding to the angle through which the internal gear 14' is moved. Thus, in the manner above described, the balancing weight 20 may be placed in any angular position with respect to the rotor 25 and in any radial position within its limits of motion, either or both, while the rotor 25 is in motion.

Since the objects of the adjustable balancing weight above described is to provide a force equal and opposite to the disturbing force developed by the unbalanced rotor and to subject the vibrating end of the rotor under investigation to this equal and opposite force, the balancing weight with its adjusting mechanism may be mounted upon the rotating body itself, as shown in Figs. 1 and 2, or may be mounted upon or form a part of the elastically constrained support of the vibrating end of the rotating body under investigation, the mechanism so mounted upon or forming a part of such elastically constrained support being suitably rotated or driven at the same speed as the rotating body under investigation. This latter arrangement is shown in Figs. 3 and 4. In this form of my machine, the rotor-shaft 26 is journaled upon rollers 30 which are in turn journaled upon a carriage 36 which, through the medium of wheels 33, is adapted to travel back and forth upon a pair of rails 40 supported at their ends upon suitable pedestals 40'. Upon depending hangers 36' carried by this carriage, a counter-shaft 26' is journaled. This counter-shaft is geared to rotate in unison with the rotor-shaft 26 by any suitable mechanism, desirably by a sprocket-chain 39 which runs over sprocket-wheels upon the rotor-shaft 26 and the counter-shaft 26'. The balancing mechanism is mounted on the counter-shaft 26' in the same manner as it is mounted upon the rotor-shaft 26 in Figs. 1 and 2. In this type of device, it is desirable to provide a centering-indicator 42 to indicate the degree of vibrations of the carriage 36, this indicator being of a well-known type and being connected to one of the hangers 36' by a rod 43. In this type of apparatus, the graduations and zero points for indicating the radial circumferential position of the weight may be arranged in any suitable manner, as is obvious.

To use my invention, I employ a mark 25' on the rotor 25 and a suitable gage or trammel, the upper edge of the gage or trammel being at the height of the axis of the rotor 25 and shaft 26. The mark 25' on the rotor 25 and the weight 20 are brought into the same plane by rotating the rotor 25 and the hand-wheels 29, the gage or trammel being used to insure that the mark and the weight are in the same plane. The weight 20 is placed in its inner or neutral position on the screw 19. The position of the internal gears 7 and 14 is then read from the marks or graduations on the thrust-rings 22 and 23 with reference to zero points 24' of wheels 7 and 14. The rotor 25 is now set in motion and its condition of unbalance will cause its elastically-constrained end to vibrate. By means of the hand-wheels 29, the worms 27 and the mechanism as above-described, the weight 20 is moved radially and circumferentially until the centrifugal force of the weight 20 is equal and opposite to the disturbing force of the rotor 25, when vibration will cease. The rotor is now stopped and, by the gage or trammel, the mark 25' on the rotor is brought to its original position. The angular position of the weight 20 with respect to the mark on the rotor can then be read from the marks or graduations on the thrust-ring 22, and the radial position of the weight 20 can be read from the marks or graduations on the thrust-ring 23. When the position of the weight 20 required for balance of one end of the rotor 25 has been ascertained, the mechanism is removed and placed on the shaft 26 at the opposite end of the rotor 25, the rotor 25 being turned end-for-end in the balancing machine. The process above described is then repeated and a radial and circumferential position of the weight 20 found which eliminates vibration of the second end of the rotor 25. Thus the two weight-positions which eliminate vibrations and the angle between the weight-positions can be determined. Knowing the actual weight of the weight 20, its two radial and circumferential positions which eliminate vibrations of the ends of the rotor 25, the angle between these two circumferential positions, the weight of the rotor 25, its linear dimensions, and the position of its center of gravity, the weight and position of the balancing weights required to place the rotor 25 in complete static and dynamic balance may be readily computed. Such computation requires only the application of the resolution of forces and the principle of levers or moments.

In the form of apparatus shown in Figs. 1 to 4, inclusive, springs 45 of the coil type are illustrated as means of resiliently restraining the vibrations of the rotor support. This type of spring is entirely satisfactory where the balancing machine is intended to be used for testing rotors at a predetermined and uniform speed, as the springs can be easily adapted to have their natural periods of vibration in substantial resonance with the vibration of the machine under a given load and a given speed. Where, however, the machine is intended to be used in connection with different speeds of rotation of the tested body, springs of this type are not suitable, as their natural periods of vibration cannot be varied by compression or expansion of the springs. To adapt the machine for various kinds of work, I have shown in Figs. 5, 6 and 7 a structure wherein the natural periods of vibration of the springs may be adjusted to suit the speed at which the tested body is to be run, in order that these supporting springs may be entirely adjusted to have exact resonance or synchronism with the periods of vibration of the body under test. In this structure, I suspend the vibratable support 31 upon a pair of depending flat springs 45' whose lower ends are attached to the support 31 and whose upper ends are attached to a pair of suitable supporting pedestals 46. I employ in connection with each spring a vertically-movable tuning and clamping device to enable me to vary the effective length of the spring to thereby vary its natural period of vibration. Any device may be employed for this purpose; I show a slidable block 47 mounted on the pedestals, a plate 48 adapted to be clamped against the face of this block by a bolt 49, the spring being provided with a vertical slot 50 for the passage of the bolt, a vertical screw 51 being employed to vertically adjust the block 47 and its attached parts. In this structure, as well as in the structure shown in Figs. 3 and 4, the balance-weight adjusting worms 27 are mounted to vibrate with the carriage or support 31, while in Figs. 1 and 2 the shaft 28 and pedestals 29' are sufficiently resilient to permit the carriage 31 and balancing mechanism mounted on the rotor to vibrate sufficiently without disruption of any of the parts.

The nature and scope of the invention having been thus indicated and its preferred embodiment having been specifically described, what is claimed as new is:

1. In a balancing machine of the class set forth, a bodily-rotatable mechanism embodying a balancing weight and adjusting devices therefor capable of moving the weight in angular position in either direction and in radial direction either in or out with respect to the axis of rotation of said mechanism while the rotating body to which the mechanism is attached is in motion, said radical adjusting device embodying a rotatable screw on which the weight moves and means for axially rotating this screw during the rotation of the mechanism.

2. In a balancing machine of the class set forth, a bodily-rotatable mechanism embodying a balancing weight and adjusting devices therefor capable of moving the weight in angular position in either direction and radial distance either in or out with respect to the axis of rotation of said mechanism while the rotating shaft to which the machine is attached continues in motion, and means whereby the machine may be attached to shafts of different diameters.

3. In a balancing machine of the class set forth, a bodily-rotatable mechanism embodying a balancing weight and adjusting devices therefor capable of moving the weight in angular position in either direction and radial distance either in or out with respect to the axis of rotation of said mechanism while the rotating body to which the machine is attached is in motion, and a bushing or sleeve whereby the machine may be attached to shafts of different diameters.

4. In a balancing machine of the class set forth, a bodily-rotatable mechanism embodying a balancing weight and adjusting devices therefor capable of moving the weight in angular position in either direction and in radial direction either in or out with respect to the axis of rotation of said mechanism while the rotating body to which the mechanism is attached is in motion, said mechanism having on one of its parts graduations or markings whereby the angular displacement of said balancing weight from its zero or neutral position may be directly measured or read, said radial adjusting device embodying a rotatable screw on which the weight moves and means for axially rotating this screw during the rotation of the mechanism.

5. In a balancing machine of the class set forth, a bodily-rotatable mechanism embodying a balancing weight, and adjusting devices therefor capable of moving the weight in angular position in either direction and radial distance either in or out with respect to the axis of rotation of said mechanism while the rotating body to which the machine is attached is in motion, said mechanism embodying an epicyclic gearing train.

6. In a balancing machine of the type set forth, a vibratable carriage, leaf spring means for restraining this carriage, and means for varying the natural periods of vibration of the spring means, thereby avoiding the necessity of using sets of interchangeable springs.

7. The mechanism substantially as herein shown and described, embodying a vibratable carriage, depending leaf springs for suspending said carriage, and means for varying the natural periods of vibration of said springs, thereby avoiding the necessity of using sets of interchangeable springs.

8. In a balancing machine of the class set forth, a bodily-rotatable mechanism embodying a balancing weight and devices for independently adjusting the weight radially as well as circumferentially with respect to the axis of said mechanism during the rotation thereof, whereby the operator may feel out the balancing point, said radial adjusting device embodying a rotatable screw on which the weight moves and means for axially rotating this screw during the rotation of the mechanism.

9. In a balancing machine of the class set forth, a bodily-rotatable mechanism embodying a balancing weight and devices for independently adjusting the weight radially as well as circumferentially with respect to the axis of said mechanism during the rotation thereof, whereby the operator may feel out the balancing point, said mechanism embodying two epicyclic gearing trains.

10. In a balancing machine, a vibratable carriage, a leaf spring at each side of the carriage for restraining the opposite movements of the carriage, and means for varying the natural periods of vibration of each of said springs, for the purpose set forth.

11. In a balancing machine, a bodily-rotatable mechanism, embodying a balancing weight and a counter-balancing weight opposite said balancing weight, and devices for adjusting said balancing weight radially as well as circumferentially with respect to the axis of rotation of said mechanism during the rotation thereof, for the purpose set forth, said radial adjusting device embodying a rotatable screw on which the weight moves and means for axially rotating this screw during the rotation of the mechanism.

12. In a balancing machine, two sets of bodily-rotatable gearing and means for rotating said sets of gearing in unison with the body to be tested, a balancing weight, and devices for adjusting said balancing weight radially as well as circumferentially through the medium of said two sets of gearing and with respect to the axis of rotation of said bodily rotatable gearing.

13. In a balancing machine, two sets of bodily-rotatable gearing and means for rotating said sets of gearing in unison with the body to be tested, a balancing-weight, and devices for adjusting said balancing-weight radially as well as circumferentially through the medium of said two sets of gearing and with respect to the axis of rotation of said bodily rotatable gearing, said devices embodying a pair of internal gears for each set of gearing, means being provided for holding one of each pair of internal gears stationary and means being also provided for rotatably adjusting the other internal gear of each pair.

14. In a balancing machine, a vibratable carriage for supporting the work to be tested, a leaf-spring at each side of the carriage for restraining the opposite movements of the carriage, and means for shortening the effective length of the springs in order to vary the natural periods of vibration thereof, for the purpose set forth.

15. In a balancing machine, a vibratable carriage for supporting the work to be tested, a depending leaf-spring at each side of the carriage, the carriage being attached to the lower ends of said springs so that said springs act as suspending means for the carriage, and means for shortening the depending effective length of the springs for varying the natural periods of vibration of the springs, for the purpose set forth.

In testimony whereof I hereunto affix my signature.

MAYSON WHITE TORBET.